United States Patent
Han et al.

(10) Patent No.: US 6,236,543 B1
(45) Date of Patent: May 22, 2001

(54) DURABLE LANDING PADS FOR AN AIR-BEARING SLIDER

(75) Inventors: Hua Han, Fremont; Kelly D. Linden, Los Gatos; Francis W. Ryan, Martinez; Lee C. Boman, Belmont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/239,594

(22) Filed: Jan. 29, 1999

(51) Int. Cl.[7] .................................................. G11B 5/60
(52) U.S. Cl. ........................................................... 360/236.6
(58) Field of Search .............................. 360/234.3, 235.1, 360/235.2, 235.3, 236.8, 236.7, 236.6, 236.5

(56) References Cited

U.S. PATENT DOCUMENTS

| | | |
|---|---|---|
| 5,079,657 | 1/1992 | Aronof et al. . |
| 5,345,353 | 9/1994 | Krantz et al. . |
| 5,550,693 | 8/1996 | Hendriks et al. . |
| 5,616,179 | 4/1997 | Baldwin et al. . |
| 5,708,540 | 1/1998 | Anath et al. . |
| 5,768,055 | 6/1998 | Tian et al. . |
| 5,796,551 | 8/1998 | Samuelson . |
| 5,841,608 | 11/1998 | Kasamatsu et al. . |
| 5,917,678 * | 6/1999 | Ito et al. ............................. 360/236.6 |
| 5,978,176 * | 11/1999 | Ezaki et al. ........................ 360/236.6 |
| 5,991,118 * | 11/1999 | Kasamatsu et al. .............. 360/236.6 |

OTHER PUBLICATIONS

Kasamatsu et al., "Stiction Free Slider for the Smooth Disk Surface," IEEE Transactions on Magnetics, vol. 31, No. 6, Nov. 1995, pp. 2961–2963

Bhatia et al., "Ultra–Thin Overcoats for the Head/Disk Interface," International Conference on Micromechatronics for Information and Precision Equipment, Tokyo, Jul. 20–23, 1997.

Yamamoto et al., "Stiction Free Slider for Lightly Textured Disks, " to be appeared in IEEE Transactions on Magnetics, vol. 34, No. 4, 1998.

Advertisement of Commonwealth Scientific Corporation, Data Storage, Jun. 1998.

* cited by examiner

*Primary Examiner*—Allen T. Cao
(74) *Attorney, Agent, or Firm*—Mark Lauer

(57) ABSTRACT

Durable landing pads for a slider air-bearing surface (ABS) are formed of tetrahedral amorphous carbon (t-aC) by filtered cathodic arc deposition. A hard carbon overcoat of the ABS is pierced to anchor the pads. The t-aC is extremely hard and highly stressed, and the pads may be laminated with a stress-relieving material. A rotating angled etching such as ion milling may be performed to undercut the hard carbon overcoat and further anchor the pads. A rotating angled deposition of t-aC may also be performed to round the pad tops, which may be trimmed to smooth corners.

20 Claims, 5 Drawing Sheets

1

DURABLE LANDING PADS FOR AN AIR-BEARING SLIDER

TECHNICAL FIELD

The present application relates to information storage and retrieval systems, and transducers for such systems.

BACKGROUND ART

Transducers for hard disk drives are conventionally formed in a slider, which has a disk-facing surface for interaction with the disk surface. During operation, the disk surface spins rapidly, typically at least several thousand revolutions per minute (RPM). Molecules of air that accompany the spinning disk surface form an air bearing that tends to lift the slider slightly from the spinning disk surface. The disk-facing surface of the slider is usually formed with an air-bearing surface (ABS) to control the lift characteristics. A known means for increasing signal resolution during both reading and writing of the transducer on the disk is to reduce the spacing between the transducer and the media.

The spacing between the transducer and media is typically the sum of several variables, including the spacing between the disk surface and the ABS, the thickness of any disk overcoat that protects the media, and any spacing between the transducer and the ABS. Conventional sliders are currently designed to "fly" at separations of less than a few microinches from a mean disk surface elevation. Roughness of the disk surface and the ABS are material factors in the spacing between the disk surface and the ABS, and minimization of roughness of these surfaces can decrease spacing between the transducer and the media and increase signal resolution.

Smooth disk and slider surfaces, however, tend to cause stiction when a slider is at rest on a disk. Mechanisms such as ramps for holding sliders away from the disk surface during nonoperation have been developed, but suffer from complexities and potential damage should the slider hit the disk surface. A conventional means for avoiding stiction involves forming a roughened portion of the disk surface for parking the slider on the disk. This unfortunately subtracts from the area of the disk that can be used for information storage. Roughening the slider ABS has also been proposed, but this increases the head-media spacing over the entire disk surface. Additionally, formation of the ABS typically occurs after the sensitive and delicate electromagnetic elements of the transducer have been formed, and so care must be taken in ABS formation not to damage those elements.

In U.S. Pat. No. 5,841,608, Kasamatsu et al. teach the advantages of etching the ABS to form a limited number of small projections that extend toward the disk. Due to a tilt of the slider during operation that raises the leading edge relative to the trailing edge, the projections are further removed from the disk surface than the trailing end of the ABS, so that spacing between the transducer and media is not increased. The slider is formed with much less crown and is held to the disk with a much lighter spring-load, reducing the tendency of the projections, which may be formed of various materials, to wear off or break free and leave harmful debris on the slider-disk interface. U.S. Pat. No. 5,768,055 to Tian et al., while much like Kasamatsu et al., stresses the importance of having an array of overcoat protrusions so that only the protrusions are in contact with the disk surface during nonoperation. Unfortunately, these protrusions also have a tendency to break free or suffer from excessive wear on the protrusion or protrusions that contact the disk surface.

An object of the present invention is to overcome the aforementioned difficulties in order to increase performance of information storage systems.

SUMMARY OF THE INVENTION

Advantages of the present invention include an improved disk-slider interface that can reduce head-media spacing without increasing stiction. To provide these advantages, the ABS is formed with durable pads that are averse to wear and do not break free easily. The pads are formed of extremely hard and durable materials that may be anchored in or attached to the slider substrate rather than deposited atop the ABS. The pads may also be formed in layers to relieve stress in the hard, high-stress materials, and improve durability.

DESCRIPTION OF THE INVENTION

Figure 1A:
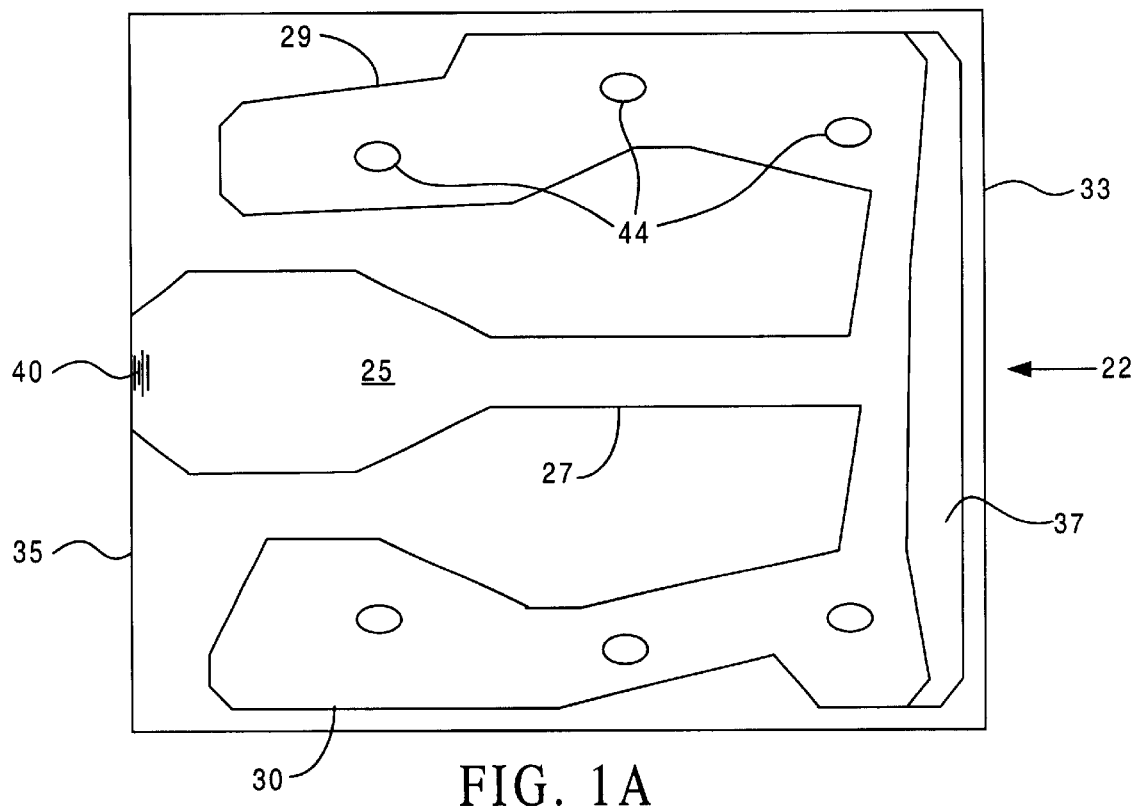
FIG. 1A is a top view of a disk-facing surface of a tri-rail slider with an ABS including a number of landing pads of the present invention.
Figure 1B:
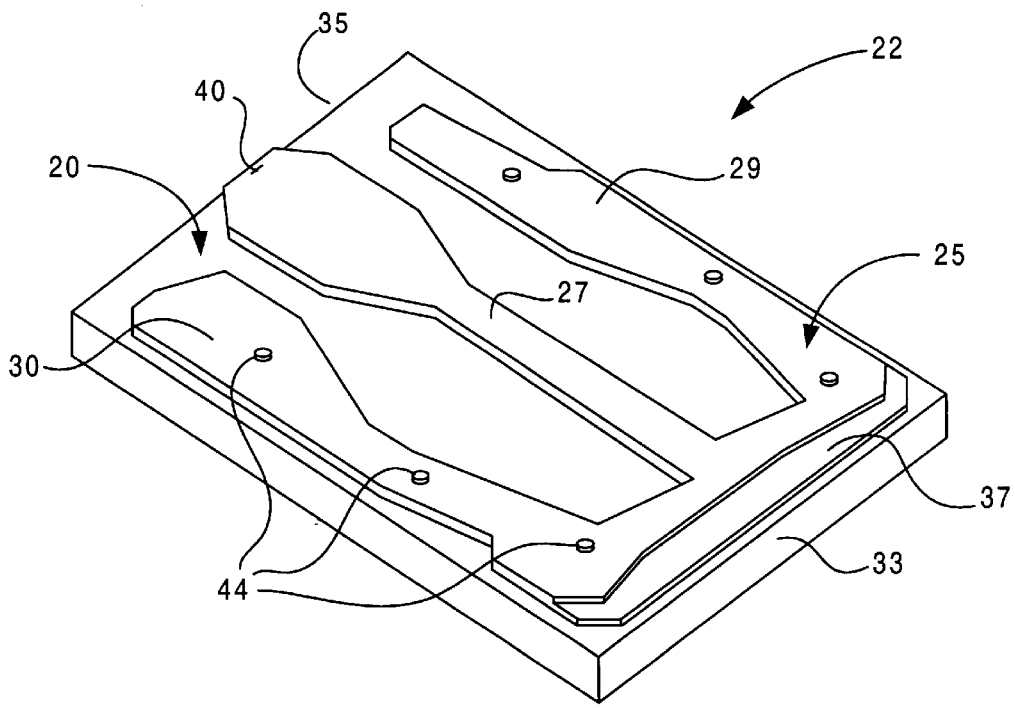
FIG. 1B is a perspective view of the slider of FIG. 1A.

Referring to FIG. 1A and FIG. 1B, a disk-facing surface 20 of a slider 22 has an air bearing surface (ABS) 25 including a center rail 27 and a pair of side rails 29 and 30. The slider 22 has a leading end 33 and a trailing end 35, with a transducer 40 disposed on the center rail 27 near the trailing end 35. A ramp 37 or shelf has been formed near the leading end 33, to provide lift to that end particularly as the disk is accelerating. The slider is designed for use with a rigid disk, not shown, that may operate at speeds ranging between a few thousand revolutions per minute (RPM) and over ten thousand RPM. The transducer 40 preferably includes an inductive write element and a magnetoresistive (MR) read element, although other means for transducing signals, such as optical sensors, may instead be employed, or the write element may be used for reading as well. For brevity, the term MR read element or sensor is used to represent any sensor that employs a changing resistance to sense magnetic fields, including anisotropic magnetoresistive (AMR), giant magnetoresistive (GMR) and spin valve (SV) sensors, for example.

A number of microscopic landing pads 44 project from the ABS 25. The pads 44 are preferably formed of tetrahedral-amorphous carbon (t-aC), a form of carbon with properties nearly equal to those of diamond, including a preponderance (over two-thirds) of $sp^3$ bonds and less than five percent impurities such as hydrogen. While six pads 44 are shown in this embodiment, the number of pads may be more or less, and for relatively small pads a much greater number may be needed or desirable. The pads 44 are shown symmetrically disposed about the center rail 27, at varying distances from that rail, although asymmetric locations may be preferred in some cases. The height of the pads in this embodiment may be in a range between about 100 Å and 400 Å, and is currently about 300 Å. For a lower flying height and/or surface roughness, pad heights may range between about 50 Å and 100 Å, with lower heights affording smaller magnetic spacing between a transducer and media. The pads are designed to remove the remainder of the ABS 25 from a disk surface while the disk is at rest. Depending in part upon the pitch of the slider, during operation one or all of the microscopic pads 44 may essentially fly over the disk surface, intermittently contact the disk surface, frequently contact the disk surface or continuously contact the disk surface, while the transducer remains in close proximity to that surface. Forming the ABS 25 with pads 44 allows the flying height of the slider to be exactingly determined without excessive concern over stiction.

Figure 2A:
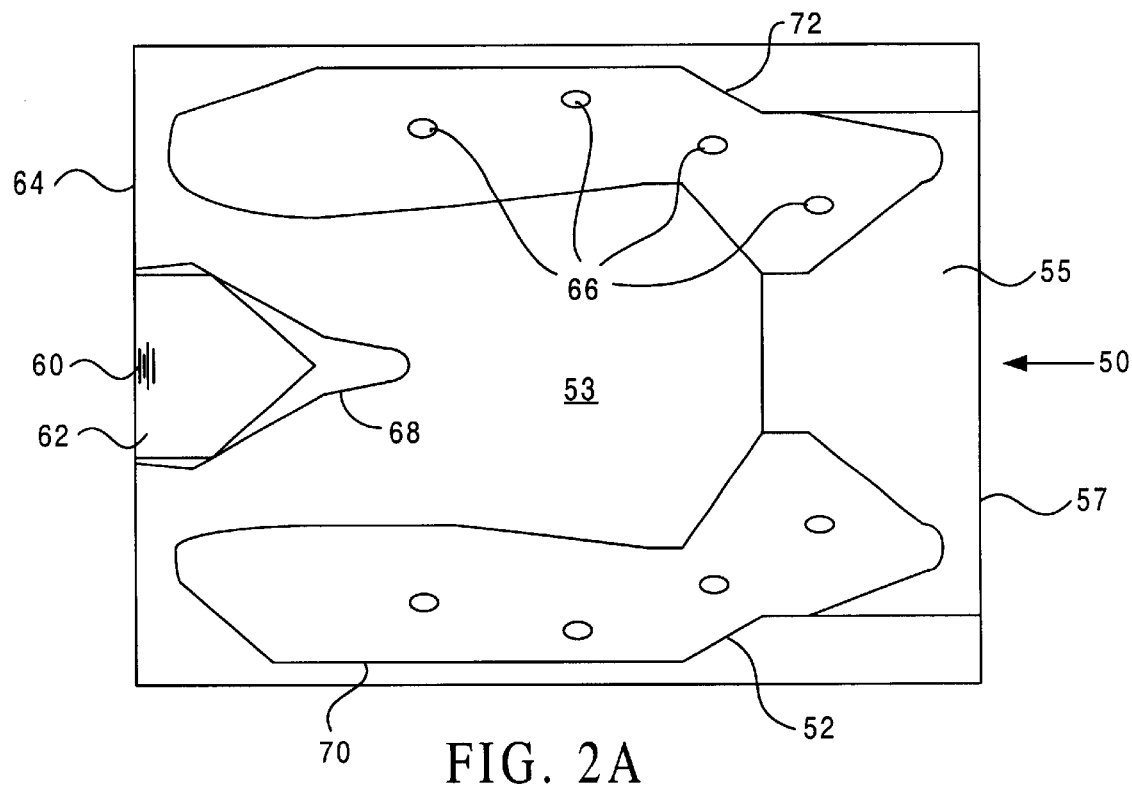
FIG. 2A is a top view of a disk-facing surface of a negative ambient slider with an ABS including a number of landing pads of the present invention.
Figure 2B:
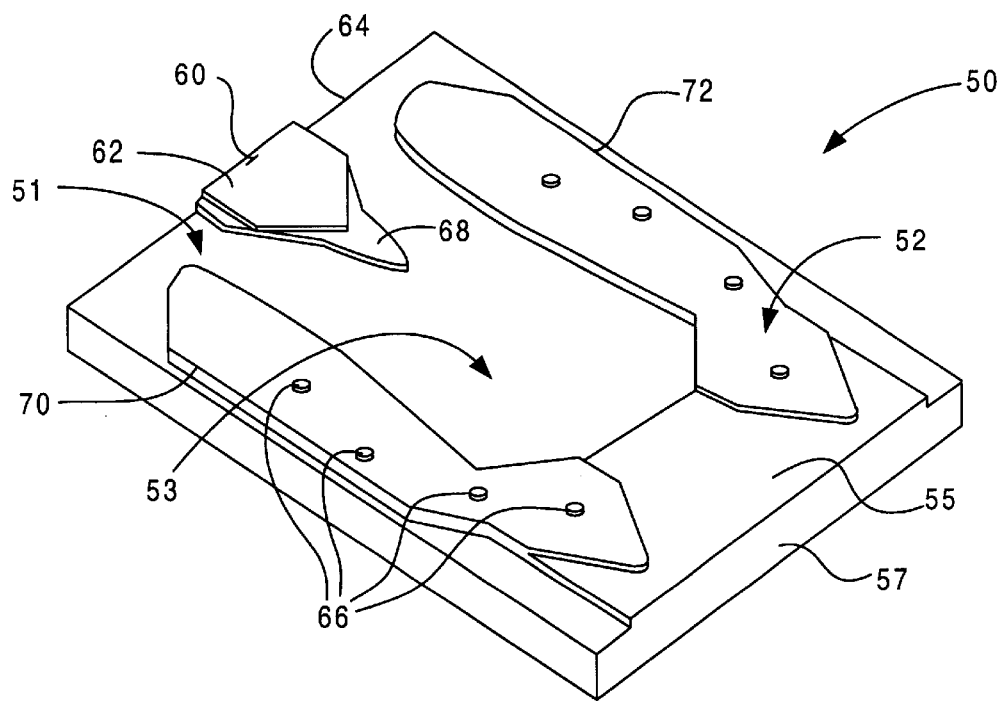
FIG. 2B is a perspective view of the slider of FIG. 2A.

In FIG. 2A and FIG. 2B, another slider 50 is depicted having a disk-facing surface 51 including an ABS 52 that partially encircles a recessed area 53 which is believed to include less than ambient pressure due to interaction between the slider and the rapidly spinning disk. A relieved section 55 of the ABS is formed near a leading edge 57 of the slider, and a transducer 60 is disposed on an island 62 at a trailing edge 64 of the slider. A shelf 68 extends between the island 62 and the recessed area 53. The recessed area 53, relieved section 55 and shelf 68 are formed by ion beam etching (IBE) or other known processes. A pair of asymmetrical wings 70 and 72 are disposed on opposite sides of the recessed area 53 and connected by the relieved section 55, the wings providing most of the lift that separates the slider from the disk during operation. A plurality of pads 66 project from the ABS 52, the pads arranged in a loosely circular array on the wings 70 and 72. In an alternate embodiment, the transducer is disposed on the trailing end of the island, with the transducer spaced from the rapidly spinning disk surface by the pads. The pads preferably project about 100 Å to 200 Å above the remainder of the ABS 52 for pico slider embodiments having between 4 and 10 pads, while lower pad heights may be preferable for smaller sliders or sliders having more pads. The pads together have a disk-facing surface that is preferably between about 0.4% and 7% of the ABS, or between 60 $\mu m^2$ and 4,000 $\mu m^2$ and individual pads may have an oval or elliptical disk-facing surface with radii on the order 10 $\mu m$.

Without the pads of the present invention, sliders such as that shown in FIG. 2 suffered from excessive stiction that handicapped employment. The extremely hard and durable pads of the present invention, however, afford the possibility of frequent or essentially continuous contact with the disk surface without the pads breaking free or wearing down and exposing the transducer to contact with the disk surface, since such contact would likely damage an MR sensor of the transducer. Experimentation with forming pads of diamond-like-carbon (DLC) showed that such pads were not strong or durable enough to last in a disk drive without the probability of excessive wear or delamination. A possible solution is to operate with much less load force than is conventional, but this requires reworking of a litany of sophisticated and highly tuned elements, from air bearing surfaces to gimbal structures, and may compromise other performance characteristics such as air bearing stiffness. The problem of excessive wear would indicate the need for harder materials, however such harder materials typically have higher stress, and are more subject to delamination. A solution to this problem was found to include forming pads of t-aC, an extremely hard and highly stressed material, and reducing the stress by interleaving at least one layer of a stress-reducing material such as Si, SiC, $SiO_2$ or $Si_3N_4$.

Figure 3:
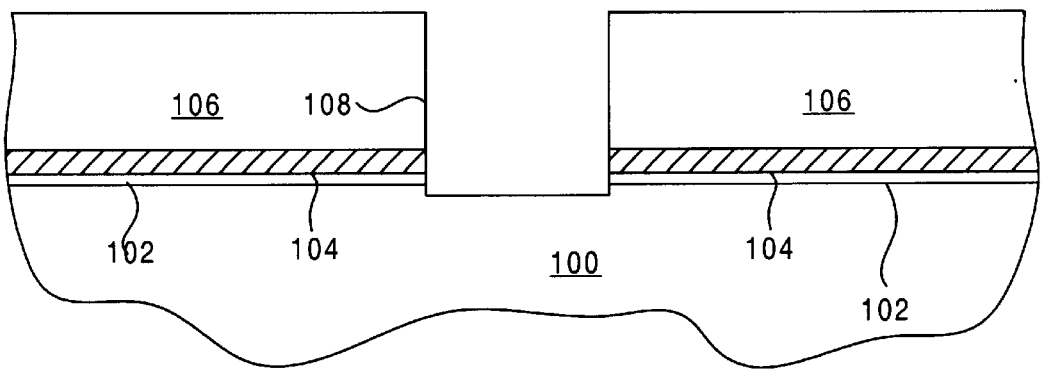
FIG. 3 is a cross-sectional view of a step in the production of landing pads of the present invention.

Beginning with FIG. 3, processes for forming the sliders of the present invention are shown. A substrate 100 which may be composed of AlTiC or other known materials has been coated with an adhesion layer 102 such as Si, SiC, $SiO_2$ or $Si_3N_4$, on top of which a primarily carbon overcoat 104 of DLC or t-aC has been formed. A mask 106 which may be formed from a dry photoresist film or a spin-on photoresist film has been patterned over the overcoat 104 to leave a void 108, and the overcoat 104 and adhesion layer 102 have been removed beneath the void by IBE, reactive ion etching (RIE) or other known processes. For a mask 106 formed of dry photoresist film, the mask may have a thickness of about 20 $\mu m$ to 50 $\mu m$, or several orders of magnitude thicker than the overcoat, whereas a spin-on photoresist film can be made thinner, and may have a thickness on the order of 1 $\mu m$.

Figure 4:
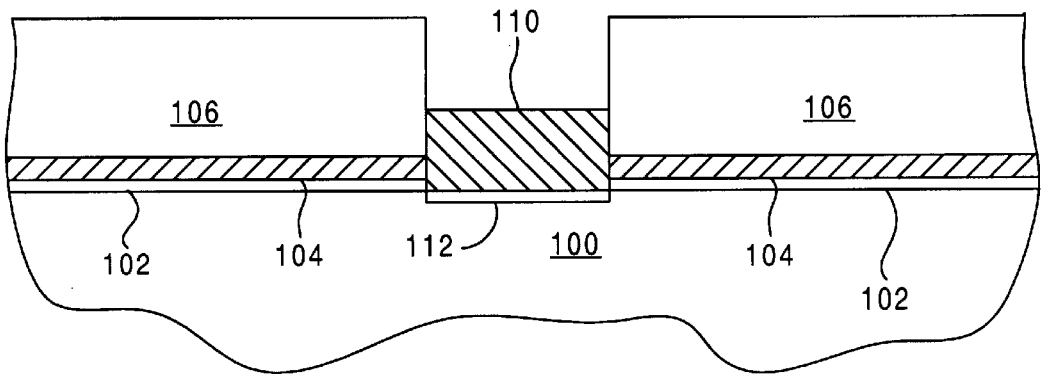
FIG. 4 is a cross-sectional view of a later step in the production of landing pads of FIG. 3.

FIG. 4 shows a pad 110 of t-aC that has been formed in the void 108 and adhered to the substrate 100 with an adhesion layer 112 of Si, SiC, $SiO_2$ or $Si_3N_4$. Formation of the pad in the void has been found to reduce pad delamination, perhaps due to cleaning a foundation for the pad or due to improved adhesion of the pad to the substrate. Another possible reason for the success in preventing pad delamination is the undercutting of the overcoat 104 during ion milling due to the relative softness of the substrate 100 and adhesion layer 102, which allows anchoring of the pad beneath the overcoat. The pad 110 is preferably formed by filtered cathodic arc deposition, in which carbon ions from a graphite cathode impinge upon the mask 106 and void 108, after passing through a filter that removes macroparticles. The resulting t-aC material has properties virtually equal to those of diamond, including high stress and hardness associated with nearly ubiquitous $sp^3$ bonds. Another benefit of t-aC is a reduction in surface energy and wettability, so that capillary attraction of the lubricant or condensed water to the pad 110 is reduced, which can lower stiction.

The t-aC pad 110 may have a hardness of 30–60 gigapascals (GPa) and a corresponding stress of 4–10 GPa. Due to the high stress and hardness of the t-aC, however, pad 110 cannot be made very thick without breaking free from the slider. In a disk drive having super-smooth, warp-free disk and slider surfaces, the pad 110 would have sufficient height to remove the ABS from the disk surface. Wear of the pad and tolerance for warping of the ABS, roughness or waviness of the disk surface, on the other hand, demand increases in the minimum pad height. Unfortunately, the height of the pad necessary to maintain separation of the ABS from the disk surface is currently greater than the thickness to which the pad can be formed without deleteriously increasing pad surface area or significantly increasing the likelihood of the pad breaking loose. Stated differently, for such a hard, high-stress material, the height of a single pad can be increased by correspondingly increasing the lateral dimensions of the pad, however this increases disk-contacting surface area of the pad, which increases stiction.

Figure 5:
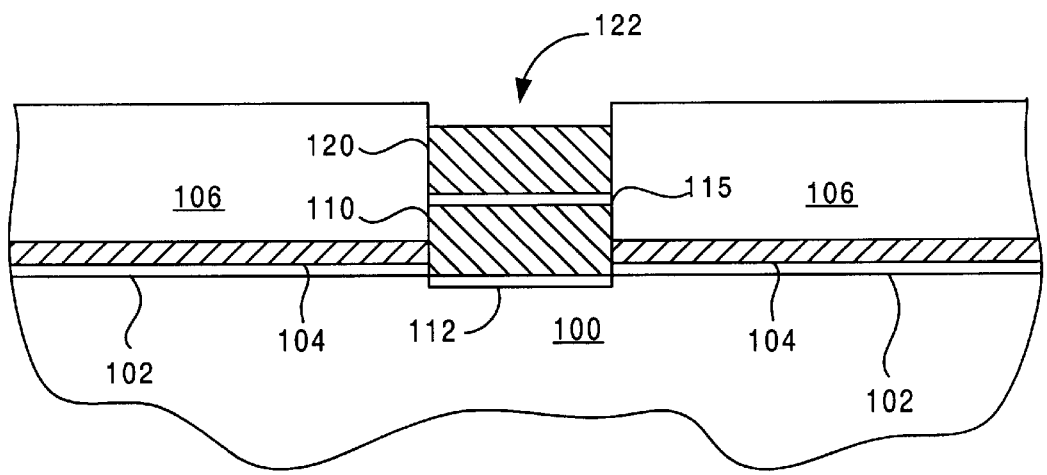
FIG. 5 is a cross-sectional view of a later step in the production of landing pads of FIG. 4.

In FIG. 5 a layer 115 of Si or other stress-relieving material is provided atop the pad section 110, with a second pad section 120 of t-aC formed on the Si layer, resulting in a much taller projecting pad 122. The sandwich of t-aC sections 110 and 120 about Si layer 115 provides a pad 122 with extreme hardness but relieved stress, and which may have an aspect ratio unsustainable for a single pad made only of high-stress t-aC. The layer 115 of Si is preferably formed to a thickness of about 10 Å to 70 Å. Pad 122 may be 50 Å–400 Å in height and may have an oval or elliptical disk-facing surface having radii in a range between about 1 $\mu$m and 100 $\mu$m. Another t-aC pad section can optionally be formed atop another Si layer to increase the height and/or aspect ratio further. Such laminated pads may have a height-to-width aspect ratio of as much as 1/10. The laminated t-aC/Si pads of the present invention allow hundreds of very small pads to be formed of high hardness, durability and aspect ratio, dramatically lowering both head-media spacing and stiction.

The Si and t-aC are formed in a single chamber by different plasma sources during different phases. This allows formation of stress reducing laminae without damaging delicate electrical and/or magnetic elements of the transducers. The Si is preferably formed by ion beam sputtering deposition. The t-aC used for the tall pads of the present invention differs from sputter-deposited or chemical-vapor-deposition (CVD) DLC in a number of ways. The t-aC is much harder than conventional DLC, having a hardness in a range between 30 GPa and 60 GPa, versus 15–20 GPa for conventional DLC. While the stress of t-aC is also much higher than that of DLC (4–10 GPa vs. 2–3 GPa), the lamination allows the extremely hard, high-stress t-aC to be made thick enough for landing pad use. The t-aC pads also contain much less hydrogen than DLC, which may help to avoid wear of the t-aC pads by combustion. Whereas conventional DLC may have 30% to 40% hydrogen (by mole), the t-aC pads have less than about 3%. The contact angle with water 75° to 85° for t-aC pads, while DLC has a contact angle of 60° to 70°, so that moisture that may precipitate to the drive interface is more likely to cause stiction with DLC than t-aC.

Figure 6:
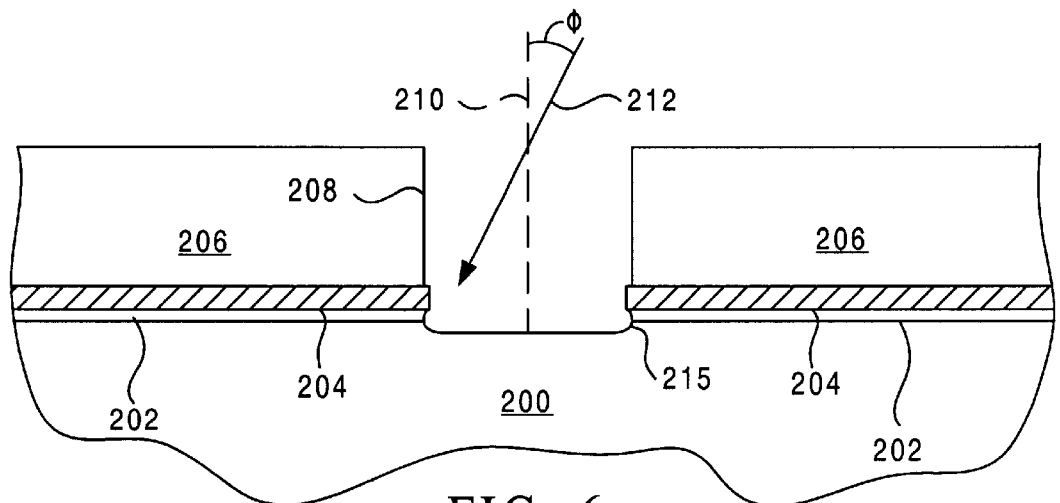
FIG. 6 is a cross-sectional view of an angled etching step in the production of landing pads of the present invention.

Beginning with FIG. 6, variations on the above process are depicted that can further ensure the durable attachment of a pad to an ABS. Much as before, a slider substrate 200 has been coated with an adhesion layer 202 of Si or other materials, and a hard carbon coating 204 of DLC, t-aC or t-aC:H has been formed. A mask 206 has been patterned to leave a void 208 in an area where a landing pad is desired. A directed etching such as ion milling is then employed at an angle $\phi$ from perpendicular 210 to the ABS, which may undercut the carbon overcoat 204. The direction of etching, which is depicted with arrow 212 rotates or precesses so that an undercut 215 may be formed on all sides. The angle $\phi$ is preferably about 45° for a dry resist mask 206 that may have a thickness of about 25 $\mu$m and a similar diameter of the void 208, which doesn't result in much undercutting due to the approximately 1:1 void aspect ratio but helps with uniformity. For voids that have a length and width of tens of $\mu$m, the preferable $\phi$ may be up to about 30°. For a mask 206 made from a spin coated resist of polymer, for instance, that has a height of 1 $\mu$m or 2 $\mu$m, the etching angle $\phi$ may be between about 45° and 75° to produce significant undercutting. For a mask 206 that has a height similar to the desired pad height, greater access by the angled etching is achieved, and increased undercutting.

Figure 7:
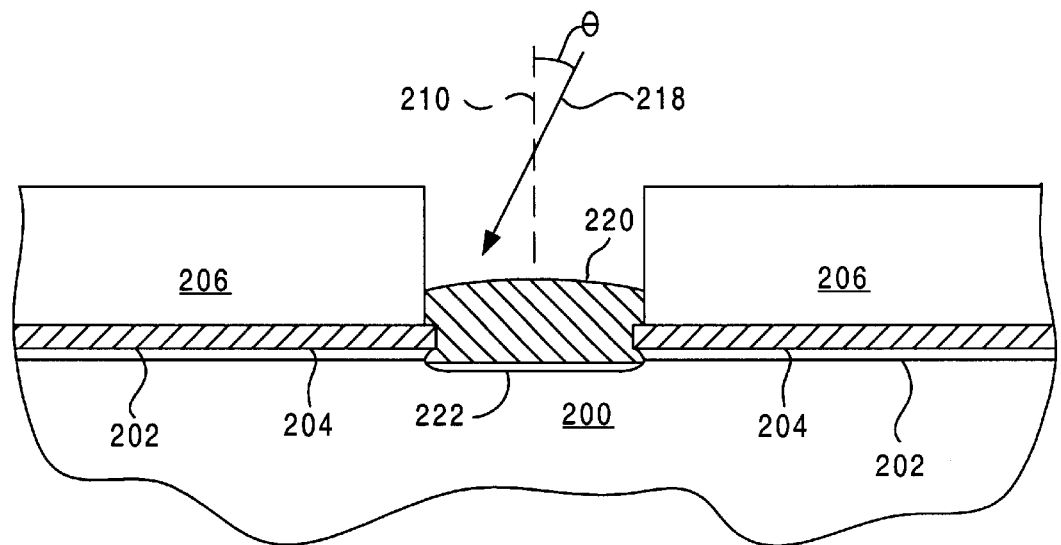
FIG. 7 is a cross-sectional view of an angled deposition step in the production of landing pads of the present invention.

FIG. 7 depicts the deposit of t-aC in a direction shown by arrow 218 that is at a rotating angle $\theta$ to perpendicular 210, forming a pad 220 and filling in the undercut 215 and help anchor the pad. The angle $\theta$ is preferably about 25° for a mask 206 with an aspect ratio of 1:1, while a Si or other adhesion layer 222 has been formed prior to the t-aC formation, by deposition at a larger angle of about 50°. For a mask 206 that is of the same order as the eventual pad height, or for a mask with a void aspect ratio between about 1:15 and 1:50, the adhesion layer may be deposited at an angle between about 45° and about 75°, while the t-aC may be deposited at an angle between about 30° and about 75°. The rotating angled carbon deposit may also yield a slight rounding to the top of pad 218, which is beneficial in avoiding stiction and wear. For voids that have much greater opening than height, a middle portion of the pad 220 may be essentially flat, while the corners are rounded.

Figure 8:
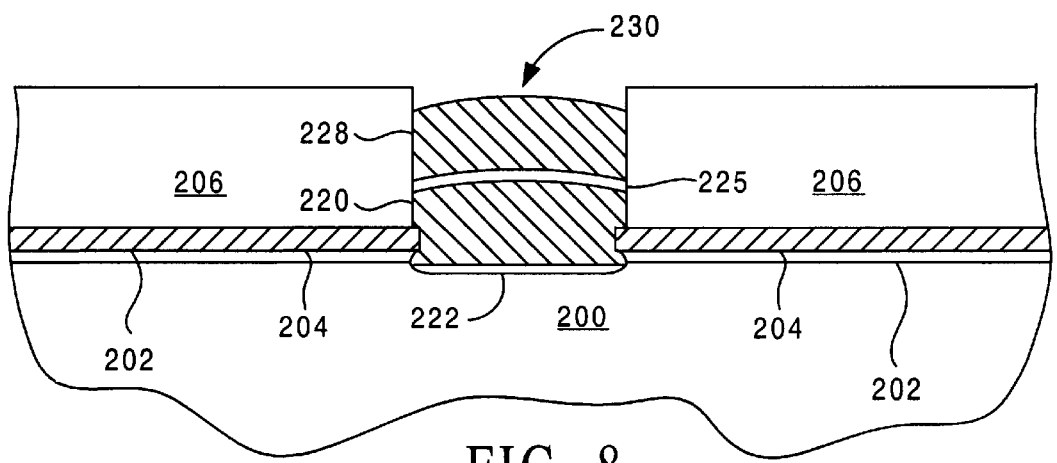
FIG. 8 is a cross-sectional view of a laminated landing pad formed by the angled deposition of FIG. 7.

In FIG. 8 a stress-relieving layer 225 such as Si has been deposited, followed by another section 228 of t-aC to form a laminated pad. By varying the angle of etching and deposition improved adhesion and tailored rounding of pad tops may be achieved. This lack of a flat surface on the part of the slider that contacts a disk while at rest is helpful in reducing stiction.

Figure 9:
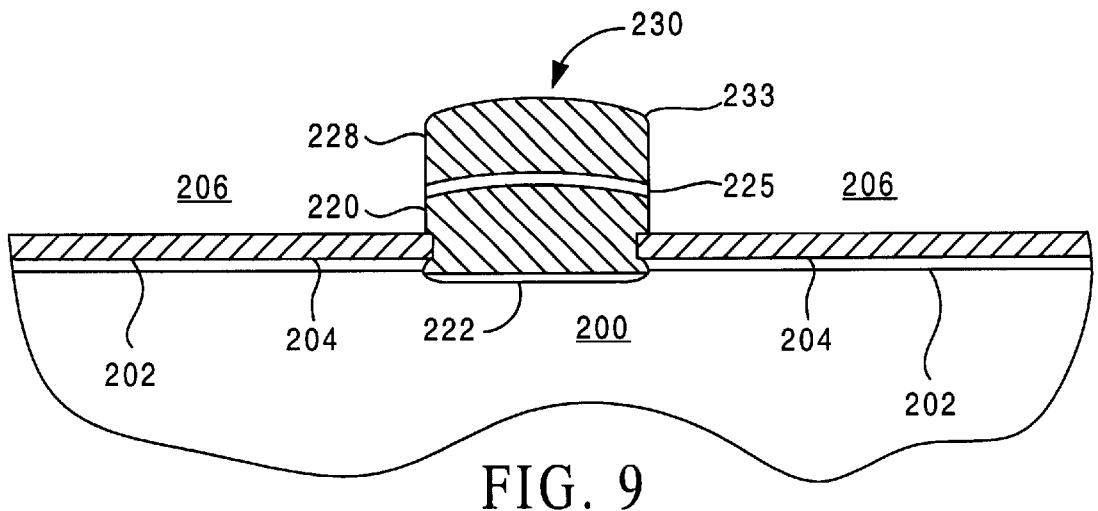
FIG. 9 is a cross-sectional view of a laminated landing pad of FIG. 8 having trimmed corners.

After removal of the mask 206, a trimming step is preferably performed by ion beam or other etching to further round the corners of pad 230, yielding rounded corners 233 shown in FIG. 9. Due to the greater exposure of those corners than the remainder of pad 230, the apex of those corners is preferentially removed to produce the smooth corners, which helps to avoid damage to the disk or pads.

Figure 10:
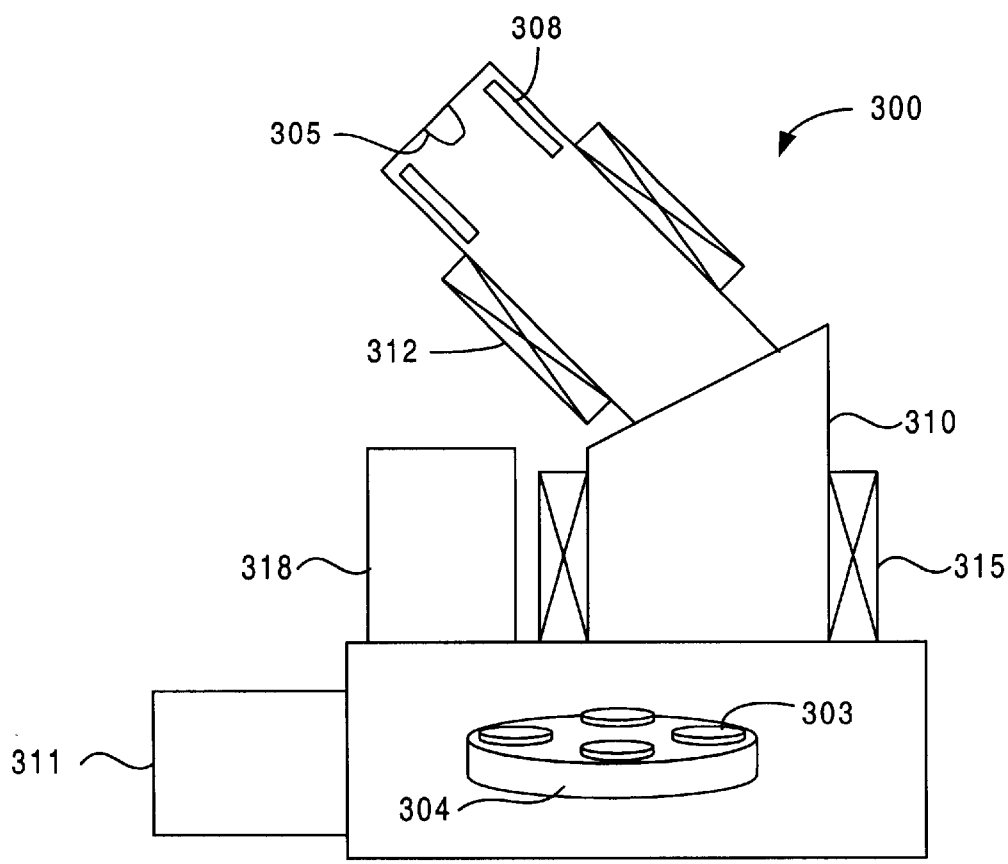
FIG. 10 is a schematic view of an apparatus used for forming t-aC carbon of the landing pads of the present invention.

FIG. 10 shows an apparatus 300 for depositing the essentially hydrogen-free t-aC on a substrate 303 holding a number of sliders, the substrate positioned on a moveable palate 304. A carbon cathode 305 is disposed near an anode 308, the anode and cathode separated by a vacuum in a chamber 310 that includes the substrate, the vacuum produced by a vacuum pump 311. An arc is created between the anode and cathode that generates carbon ions as well as some macroparticles at the cathode, the ions and macroparticles traveling generally toward the cylindrical, water cooled anode. A focusing solenoid 312 located near the anode directs carbon ions and to some extent the macroparticles toward a filtering solenoid 315, which filters out most macroparticles that are generated by the arc, while guiding the carbon ions toward the substrate. Stated differently, the charge to mass ratio of the carbon ions is much higher than that of the macroparticles, causing the ions to be guided through the path defined by the solenoid 315 while the macroparticles fly out of that path. Such a filtered cathodic arc system is disclosed in U.S. Pat. No. 5,279,723, which is incorporated herein by reference, and a similar system may be obtained from Commonwealth Scientific Corporation, 500 Pendleton Street, Alexandria, Va. 22314. An adjoining chamber 318 may be opened for a separate step of providing sputtered Si or other materials used for forming stress-relieving adhesion layers, with the carbon source walled off and the substrate rotated. This allows the stress of the pads to be reduced without dramatically varying the bias voltage of the substrate 303 in a fashion that may damage the delicate layers that form MR sensors.

Laser ablation of a carbon target to produce carbon ions that are directed toward a slider ABS is another means for forming the t-aC pads of the present invention, as are alternate processes that produce a pure carbon ion plasma. An alternative material that has been used with success for landing pads is t-aC:H. This material is formed into landing pads by ion beam CVD of $C_2H_4$ or $C_2H_2$, assisted by a low energy Ar process. The resulting material, which contains about 15% to 25% hydrogen, has properties somewhat between those of DLC and t-aC, including a hardness between 20 GPa and 30 GPa, a stress of 3.5 GPa to 4.0 GPa, a wetting angle with water of 70°–75°. Other modifications may become apparent to those of skill in the art without departing from the scope of the invention, as defined in the following claims.

What is claimed is:

1. A head for reading or writing information on a relatively moving rigid disk, the head comprising:

a body containing a transducer and having a leading edge separated from a trailing edge by a disk-facing surface, said disk-facing surface having an air-bearing portion and a recessed portion, with said air-bearing portion having a hard coating containing carbon and disposed over a substrate, and a plurality of microscopic pads attached to said body, projecting from said air-bearing portion and piercing said hard coating, each of said pads containing a pad material made of carbon atoms interconnected by $sp^3$ bonds.

2. The head of claim 1 wherein said pads contain plural layers of said pad material, with a stress-relieving layer disposed between said plural layers of said pad material.

3. The head of claim 1 wherein said hard coating overhangs a portion of said pads.

4. The head of claim 1 wherein said pads are anchored to said body.

5. The head of claim 1 wherein said pads each have a top that is rounded.

6. The head of claim 1 wherein said pad material is t-aC.

7. The head of claim 1 wherein said pad material is essentially hydrogen-free.

8. The head of claim 1 wherein said pad material is t-aC:H.

9. The head of claim 1 wherein said hard coating contains t-aC.

10. The head of claim 1 wherein said pads fill a void in said hard coating.

11. A head for reading or writing information on a relatively moving rigid disk, the head comprising:

a body containing a transducer and having a leading edge separated from a trailing edge by a disk-facing surface, said disk-facing surface having an air-bearing portion and a recessed portion, with said air-bearing portion having a coating of a hard carbon-containing material and including a plurality of microscopic pads, said pads each having a plurality of layers containing t-aC that are separated by a stress-relieving layer.

12. The head of claim 11 wherein said pads pierce said coating.

13. The head of claim 11 wherein said pads are anchored beneath said coating.

14. The head of claim 11 wherein said pads each have a top that is rounded.

15. The head of claim 11 wherein said stress-relieving layer contains Si.

16. The head of claim 11 wherein said coating is made of t-aC.

17. The head of claim 11 wherein said pads have a height-to-width aspect ratio of between 1/1000 and 1/10.

18. A head for reading or writing information on a relatively moving rigid disk, the head comprising:

a body containing a transducer and having a leading edge separated from a trailing edge by a disk-facing surface, said disk-facing surface having an air-bearing portion and a recessed portion, with said air-bearing portion having a hard coating formed over a substrate, said coating having a plurality of microscopic holes, wherein said air-bearing portion includes a plurality of microscopic pads with each of said pads protruding from one of said holes.

19. The head of claim 18, wherein said pads each have a plurality of hard carbon-containing layers separated by a stress-relieving layer.

20. The head of claim 18, wherein said pads each have more than two hard carbon-containing layers with a stress-relieving layer disposed between each pair of said hard carbon-containing layers.

* * * * *